United States Patent
Lin et al.

(10) Patent No.: US 11,492,563 B2
(45) Date of Patent: *Nov. 8, 2022

(54) CONVERSION PROCESS FOR AN INFERIOR OIL

(71) Applicant: BEIJING SANJU ENVIRONMENTAL PROTECTION & NEW MATERIALS CO., LTD, Beijing (CN)

(72) Inventors: Ke Lin, Beijing (CN); Lixin Guo, Beijing (CN); Yongjun Cui, Beijing (CN)

( * ) Notice: Subject to any disclaimer, the term of this patent is extended or adjusted under 35 U.S.C. 154(b) by 8 days.

This patent is subject to a terminal disclaimer.

(21) Appl. No.: 16/426,886

(22) Filed: May 30, 2019

(65) Prior Publication Data

US 2019/0330547 A1 Oct. 31, 2019

Related U.S. Application Data

(63) Continuation of application No. PCT/CN2018/122668, filed on Dec. 21, 2018.

(30) Foreign Application Priority Data

Apr. 28, 2018 (CN) .......................... 201810403697.5
Sep. 19, 2018 (CN) .......................... 201811092023.4

(51) Int. Cl.
| | | |
|---|---|---|
| C10G 69/04 | (2006.01) | |
| C10G 1/00 | (2006.01) | |
| C10G 1/06 | (2006.01) | |
| C10G 1/08 | (2006.01) | |
| C10G 2/00 | (2006.01) | |
| C10G 3/00 | (2006.01) | |
| C10G 11/04 | (2006.01) | |

(52) U.S. Cl.
CPC ............. *C10G 69/04* (2013.01); *C10G 1/002* (2013.01); *C10G 1/06* (2013.01); *C10G 1/086* (2013.01); *C10G 2/332* (2013.01); *C10G 3/45* (2013.01); *C10G 3/50* (2013.01); *C10G 3/56* (2013.01); *C10G 11/04* (2013.01); *C10G 2300/202* (2013.01); *C10G 2300/4012* (2013.01); *C10G 2300/70* (2013.01)

(58) Field of Classification Search
CPC .......... C10G 69/04; C10G 1/002; C10G 1/06; C10G 1/086; C10G 2/332; C10G 3/45; C10G 3/50; C10G 3/56; C10G 11/04; C10G 2300/70; C10G 2300/202; C10G 2300/4012; Y02P 30/20

See application file for complete search history.

(56) References Cited

U.S. PATENT DOCUMENTS

| | | | |
|---|---|---|---|
| 2,917,450 A * | 12/1959 | Hengstebeck | ......... C10G 69/04 208/66 |
| 3,803,028 A | 4/1974 | Mead et al. | |
| 4,227,467 A | 10/1980 | Kindsfather | |
| 5,322,617 A | 6/1994 | de Bruijn et al. | |
| 8,448,583 B2 | 5/2013 | Apps et al. | |
| 2011/0078095 A1 | 3/2011 | Eckhardt | |
| 2011/0256039 A1 | 10/2011 | Liu et al. | |
| 2013/0239479 A1 | 9/2013 | Gao et al. | |
| 2014/0117282 A1 | 5/2014 | Liu et al. | |
| 2016/0147809 A1 | 5/2016 | Schreter et al. | |

FOREIGN PATENT DOCUMENTS

| | | |
|---|---|---|
| CA | 1195639 A1 | 10/1985 |
| CA | 101805629 A | 8/2010 |
| CN | 1970690 A | 5/2007 |
| CN | 1990832 A | 7/2007 |
| CN | 101585557 A | 11/2009 |
| CN | 102426596 A | 4/2012 |
| CN | 102465043 A | 5/2012 |
| CN | 103212293 A | 7/2013 |
| CN | 103706380 A | 4/2014 |
| CN | 103877999 A | 6/2014 |
| CN | 103990458 A | 8/2014 |
| CN | 104168350 A | 11/2014 |

(Continued)

OTHER PUBLICATIONS

Extended European Search Report of European Application No. 18916095.5.

(Continued)

*Primary Examiner* — Thuan D Dang
(74) *Attorney, Agent, or Firm* — W&K IP

(57) ABSTRACT

Provided is a conversion process for an inferior oil, relating to the field of biomass utilization, energy and chemical industry. The conversion process is carried out in presence of a catalyst selected from the group consisting of an iron oxide compound, a desulfurization waste agent resulting from use of an iron oxide compound as desulfurizer, and a regeneration product of the desulfurization waste agent, under a controlled molar ratio of iron element to sulfur element. It is found that free radical condensation polymerization of inferior oil during cracking process can be blocked effectively by using carbonylation, and hydrogenation is achieved with active hydrogen produced from the conversion of CO and water. In the conversion process, inferior oil can be, directly converted, thereby increasing liquefaction yield and calorific value of the obtained oils. No large amount of waste water is generated after completion of the conversion.

23 Claims, No Drawings

(56) References Cited

FOREIGN PATENT DOCUMENTS

| | | | |
|---|---|---|---|
| CN | 105126933 | A | 12/2015 |
| CN | 105516311 | A | 4/2016 |
| CN | 105808681 | A | 7/2016 |
| CN | 105824899 | A | 8/2016 |
| CN | 106929048 | A | 7/2017 |
| CN | 107103044 | A | 8/2017 |
| CN | 108165290 | A | 6/2018 |
| EP | 0182309 | A1 | 5/1986 |
| JP | 5759986 | B2 | 9/1987 |

OTHER PUBLICATIONS

Search Report of International Application No. PCT/CN2018/122668.
Written Opinion of International Application No. PCT/CN2018/122668.
Office Action of European Application No. 18916095.5 from EPO dated Aug. 11, 2020.
Office Action of CN201811092023.4 dated Aug. 16, 2019.
Second Office Action of European Application No. 18916095.5.
First Office Action of Chinese Application No. 2019103346470.
Office Action of SG Application No. 11201912750P, dated May 12, 2021.
Office Action of CN Application No. 201710850892.8, dated Dec. 1, 2020.
Office Action of CN Application No. 201710850892.8, dated Mar. 23, 2021.
Office Action of MY Application No. PI2019007207, dated Apr. 22, 2022.

\* cited by examiner

CONVERSION PROCESS FOR AN INFERIOR OIL

CROSS-REFERENCE TO RELATED APPLICATIONS

This application is a continuation of International Patent Application No. PCT/CN2018/122668 with an international filing date of Dec. 21, 2018, designating the United States, now pending, and further claims priority benefits to Chinese Patent Applications No. 201810403697.5, filed Apr. 28, 2018 and Chinese Patent Applications No. 201811092023.4, filed Sep. 19, 2018. The contents of all of the aforementioned applications, including any intervening amendments thereto, are incorporated herein by reference.

TECHNICAL FIELD

The present invention relates to the field of biomass utilization, energy and chemical industry, and more particularly to a conversion process for an inferior oil.

BACKGROUND

With rapid development of social economy, non-renewable fossil energy sources such as coals, crude oils, natural gases and oil shales are running out. At the same time, environmental pollution caused by pollutants such as $CO_2$, $SO_2$, $NO_x$ produced by burning such non-renewable fossil energy sources also becomes increasingly serious, forcing humans to think about ways to obtain energy and ways to improve environment.

At present, conversion technology of inferior oil has become a new means of obtaining energy. In the prior art, inferior oil is generally converted to light oil through direct hydrogenation with pure hydrogen at a certain temperature and pressure under the presence of catalysts.

In the above-mentioned conversion technology of inferior oil, a large amount of waste water will be generated in the process of converting inferior oil to light oil. Furthermore, the above liquefaction process has strict requirements for reaction atmospheres and catalysts, and generally requires pure hydrogen atmosphere and noble metal catalyst, so is less economical. In addition, oils obtained in the above conversion process have low calorific value. In theory, changing the conversion atmosphere, reducing the raw material processing cost, or choosing cheap catalysts are beneficial to further development of the conversion process. Therefore, some scholars have tried to use non-hydrogen environment for biomass liquefaction conversion, but the catalyst has low catalytic efficiency, so such conversion cannot be industrially popularized and applied.

SUMMARY OF THE INVENTION

The present invention is designed to overcome the defects of strict requirements for reaction atmospheres and catalysts, low calorific value of the oils and large amount of waste water generated in the prior inferior oil conversion process, and further to provide a conversion process for an inferior oil adopting CO as reaction atmosphere. The resulted oils have high calorific value, and waste water production is low, even without waste water.

For this purpose, the above-mentioned object of the present invention is achieved by the following technical solutions:

The present invention provides a conversion process for an inferior oil, comprising the following steps:

preparing a first slurry that comprises a catalyst and an inferior wherein the catalyst is at, least one selected from the group consisting of an iron oxide compound, a desulfurization waste agent resulting from use of an iron oxide compound as desulfurizer, and a regeneration product of a desulfurization waste agent resulting from use of an iron oxide compound as desulfurizer;

carrying out a first conversion reaction by mixing the first slurry with a pure CO gas or a CO containing gas and keeping a molar ratio of iron element to sulfur element of 1:(0.5-5) in a reaction system, thereby obtaining a first conversion oil product.

Preferably, a sulfur-containing substance is added to the catalyst to control the reaction system to have a molar ratio of iron element to sulfur element of 1:(0.5-5), preferably 1:(0.5-2), and more preferably 1:(1-2).

Preferably, the sulfur-containing substance is at least one selected from the group consisting of sulfur, hydrogen sulfide, and carbon disulfide.

Preferably, the CO containing gas has a CO volume content of no less than 15%, preferably no less than 25%, more preferably no less than 50%, and most preferably no less than 90%.

Preferably, the CO containing gas is a gas mixture of CO and $H_2$ or a synthesis gas.

Preferably, the desulfurization waste agent is at least one selected from the group consisting of a waste agent of a desulfurizer comprising iron oxide as an active component, a waste agent of a desulfurizer comprising $Fe_{21.333}O_{32}$ as an active component and a waste agent of a desulfurizer comprising FeOOH as an active component; or the regeneration product is at least one selected from the group consisting of a regeneration product of a desulfurization waste agent of a desulfurizer comprising iron oxide as an active component, a regeneration product of a desulfurization waste agent of a desulfurizer comprising $Fe_{21.333}O_{32}$ as an active component, and a regeneration product of a desulfurization waste agent of a desulfurizer comprising FeOOH as an active component.

Preferably, the iron oxide is $Fe_2O_3$ and/or $Fe_3O_4$.

Preferably, the $Fe_2O_3$ is at least one selected from the group consisting of $\alpha$-$Fe_2O_3$, $\alpha$-$Fe_2O_3 \cdot H_2O$, $\gamma$-$Fe_2O_3$, $\gamma$-$Fe_2O_3 \cdot H_2O$, amorphous $Fe_2O_3$, and amorphous $Fe_2O_3 \cdot H_2O$; the $Fe_3O_4$ is of cubic crystal system; and the FeOOH is at least one selected from the group consisting of $\alpha$-FeOOH, $\beta$-FeOOH, $\gamma$-FeOOH, $\delta$-FeOOH, $\theta$-FeOOH, and amorphous FeOOH.

Preferably, the regeneration product is obtained with a slurry method by subjecting the desulfurization waste agent resulting from use of iron oxide compound as desulfurizer to oxidation, vulcanization and oxidation.

Preferably, the slurry method comprises the following steps:

preparing a second slurry by mixing the desulfurization waste agent resulting from use of iron oxide compound as desulfurizer with water or an alkali solution;

carrying out a first oxidation reaction by adding an oxidizing agent to the second slurry to obtain an oxidized slurry;

carrying out a vulcanization reaction by adding a vulcanizing agent to the oxidized slurry to obtain, a vulcanized slurry;

carrying out a second oxidation reaction by adding an oxidizing agent to the vulcanized slurry;

repeating the vulcanization reaction and the second oxidation reaction to obtain a final slurry; and subjecting the final slurry to solid-liquid separation to obtain the regeneration product.

Preferably, the first conversion reaction is carried out at a reaction pressure of 5-22 MPa and a reaction temperature of 200-480° C.

Preferably, the first conversion reaction has a reaction time of no less than 15 min, preferably 15-120 min, and more preferably 30-90 min.

Preferably, the catalyst is present in an amount of 0.1 to 10% by weight in the first slurry; and the catalyst has an average particle diameter of from 0.1 µm to 5 mm, preferably from 5 µm to 100 µm, and most preferably from 5 µm to 50 µm.

Preferably, said carrying out a first conversion reaction by mixing the first slurry with a pure CO gas or a CO containing gas comprises the following steps: pressurizing and heating a pure CO gas or CO containing gas to a pressure of 5-22 MPa and a temperature of 150-600° C., then mixing with the first slurry in a reaction system to carry out a first conversion reaction.

Preferably, said carrying out a first conversion reaction by mixing the first slurry with a pure CO gas or a CO containing gas comprises the following steps: pressurizing and heating a partial of the pure CO gas or CO containing gas to a pressure of 5-22 MPa and a temperature of 150-600° C., then mixing with the first slurry in a reaction system to carry out a first conversion reaction, and pressurizing and heating the remaining pure CO gas or CO containing gas to a pressure of 5-22 MPa and a temperature of 300-600° C., then mixing with the first slurry in a reaction system to carry out a first conversion reaction.

Preferably, a volume ratio of the pure CO gas or CO containing gas to the first slurry is (50-10000):1, preferably (200-10000):1, preferably (100-5000):1, and preferably (1000-5000):1.

Preferably, the reaction system is carried out in a reactor which is any one of a suspended bed reactor, a slurry bed reactor, a bubbling bed reactor, a fluidized bed reactor, and a one-batch reactor; or, the reactor is any one or more of a suspended bed reactor, a slurry bed reactor, a bubbling bed reactor, a fluidized bed reactor, and a one-batch reactor connected in series or in parallel.

Preferably, the inferior oil is at least one selected from the group consisting of a mineral oil, palm oil, oil sand's oil, gutter oil, a petroleum-based wax oil, and a canola oil.

Preferably, the conversion process further comprises carrying out, a second conversion reaction at a reaction pressure of 5-22 MPa and a reaction temperature of 250-450° C. with the first conversion oil product and a hydrogen-rich gas to obtain a final oil product.

Preferably, the hydrogen-rich gas has a hydrogen content by volume of no less than 80%, preferably no less than 90%, and most preferably pure hydrogen.

Preferably, the second conversion reaction is carried out in a slurry bed reactor, a bubbling column reactor, a suspended bed reactor or a fixed bed reactor, and hydrocracking and refining reactions are carried out under a hydrogen-rich atmosphere.

Preferably, the second conversion reaction has a reaction time of no less than 15 min, preferably 15-180 min, and more preferably 15 to 90 min.

Preferably, a volume ratio of the hydrogen-rich, gas to the first conversion oil product is (200 to 5000):1, preferably (300 to 3000):1.

Preferably, the conversion process comprises a step of adding a hydrogenation catalyst and/or a further amount of the catalyst to the first conversion oil product before carrying out the second conversion reaction.

Preferably, when the inferior oil is a mineral oil, the first slurry is a non-aqueous slurry, and when the inferior oil is an oil other than a mineral oil, the first slurry is an aqueous slurry.

The technical solution of the present invention has the following advantages:

1. The conversion process for an inferior oil provided by the present invention is carried out in the presence of a catalyst which is at least one selected from the group consisting of an iron oxide compound, a desulfurization waste agent resulting from use of an iron oxide compound as desulfurizer, and a regeneration product of the desulfurization waste agent, under a controlled molar ratio of iron element to sulfur element in a reaction system. It is found that free radical condensation polymerization of the inferior oil during the cracking process can be blocked effectively due to carbonylation, and hydrogenation is achieved with active hydrogen produced from the conversion of CO and water (refers to water produced in the conversion process of the inferior oil). In the conversion reaction, the inferior oil can be directly converted, thereby increasing liquefaction yield and calorific value of the obtained oils. Besides, no large amount of waste water is generated after completion of the conversion reaction.

Further, it can effectively improve the conversion rate of the inferior oil by carrying out a second conversion reaction.

2. Further, in the conversion process for an inferior oil of the present invention, the desulfurization waste agent is at least one selected from the group consisting of a waste agent of a desulfurizer comprising iron oxide as an active component, a waste agent of a desulfurizer comprising $Fe_{21.333}O_{32}$ as an active component and a waste agent of a desulfurizer comprising FeOOH as an active component; and the regeneration product is at least one selected from the group consisting of a regeneration product of a desulfurization waste agent of a desulfurizer comprising iron oxide as an active component, a regeneration product of a desulfurization waste agent of a desulfurizer comprising $Fe_{21.333}O_{32}$ as an active component, and, a regeneration product of a desulfurization waste agent of a desulfurizer comprising FeOOH as an active component. By incorporating an appropriate amount of sulfur in the above catalysts, it is found that under CO atmosphere these catalysts firstly combine with CO to form a carbonyl compound which then grafts carbon atoms to a small molecule active site formed by thermal cracking of the inferior oil. At the same time, CO shift occurs under the catalytic action of iron and sulfur elements, producing hydrogen in-situ, thereby realizing catalytic hydrodeoxidation to reduce oxygen content in the oil products. In this way, the conversion yield of the inferior oil and the conversion yield of oils from long molecular chains to small molecules are greatly improved.

The regeneration product of a desulfurization waste agent resulting from use of an iron oxide compound as desulfurizer is obtained by a slurry process comprising subjecting an iron oxide compound alternately to vulcanization and oxidation regeneration. Furthermore, by repeating vulcanization and oxidation for many times, iron oxide compound and iron sulphide compound undergo crystal phase reconstruction and conversion. Since $S^{2-}$ ionic radius (0.18 nm) is greater than $O^{2-}$ ionic radius (0.14 nm), the crystal cells of iron oxide compound undergo shrinkage and expansion along with the conversion between Fe—O bond and Fe—S bond, as a result, stable crystalline particles of the iron oxide compound become loose and crack, producing a large amount of nano-iron compounds which are well-philophilic and easily vulcanized. At the same time, the surface of the nano-iron compound is covered with a non-polar elemental sulfur layer, which can not only prevent from agglomeration and growth of the nano-iron compound particles, thus greatly improving the dispersibility thereof, but also can ensure highly dispersion of the nano-iron compounds in non-polar oils based on the principle of similar mutual solubility. Furthermore, nano-iron compounds covered with sulfur have the following advantages: sulfur and iron are closely linked and the nano-iron compound itself has a smaller particle size, so sulfur can react with nano-iron compounds at low temperature to form pyrrhotite ($Fe_{1-x}S$) having hydrogenation activity for inferior heavy oils. Finally, the regeneration product obtained by this method has small particle size, good lipophilicity, and a sheet like nanostructure. Sheets in the nanostructure are separated from each other by adsorbed sulfur, thereby avoiding agglomeration thereof, greatly improving the adsorption capacity for CO and enhancing the abilities of carbonylation, hydrogen production through shift and catalytic hydrogenation.

3. In the conversion process for an inferior oil product of the present invention, reaction raw materials and a CO containing gas are transported to a reactor, where reactions including cracking, carbonylation, shift, hydrogenation and so on occur in the presence of suitable catalyst under, appropriate temperature, pressure, and gas-liquid ratio. Further, by using a slurry bed reactor, the reaction raw materials are firstly fed to the slurry bed reactor through the bottom thereof, and at the same time, a CO containing gas is injected into the reactor to react with the raw materials. In this way, based on difference in specific gravity of gas and liquid materials in the reactor along with change of specific gravity difference caused by the yield of light oil products, differential control of the flow velocity of each phase is realized, so that the raw materials in the reactor undergo cracking, carbonylation, shift, hydrogenation, and reaction from bottom to, top. In this process, even though the catalyst solid particles which have a large specific gravity rise with gas and light oils, they return to the bottom and participate in the reaction again under the action of the CO containing gas in the upper. In the reaction, by appropriately adjusting the amount of the CO containing gas injected to the reactor according to the density of materials in the upper, middle and lower portions of the reactor, circulation of the unconverted inferior oils in the reactor and balanced discharge of the catalysts are achieved, thereby ensuring all kinds of reactions are sufficiently carried out, which is beneficial to improve the conversion rate of an inferior oil and the yield of bio-oils.

4. In the conversion process for an inferior oil provided by the present invention, a CO containing gas is used in the reaction process, which may be pure CO or impure. For example, in addition to CO, it may also comprise hydrogen, hydrogen sulfide, methane, etc., or it may also be a synthesis gas produced by gasification of coal, biomass, natural gas, and inferior oil. In addition to CO, the remaining part of the synthesis gas may be a mixture of hydrogen, carbon dioxide or methane, ethane, etc., so the cost of gas production is greatly reduced. In the process of reaction, a combined process of cracking reaction, carbonylation reaction, shift reaction and hydrogenation reaction is realized by using a CO containing gas and an inexpensive iron-based catalyst or a waste agent. It is easy to provide sufficient free radicals to avoid carbonization and coking of inferior oils, so the conversion rate of inferior oils and liquid yield are high, and reaction temperature and pressure are lowered. The oils produced by the liquefaction process can also be used to prepare slurry in the preceding process.

DETAILED DESCRIPTION OF EMBODIMENTS

The technical solution of the present invention will now be described in detail with reference to the accompanying drawings. Obviously, the described embodiments are exemplary embodiments of the invention, rather than all embodiments. Based on embodiments in the present invention, all other embodiments obtained by those skilled in the art without making creative work are within the scope of the present invention.

Embodiment 1

Provided is a co-conversion process for oil sand's oil and hogwash oil described as below.

Catalyst: A waste agent resulting from use of a desulfurizer comprising FeOOH as an active component is used as a catalyst. The desulfurizer comprises 6 g soluble iron salt $Fe(NO_3)_3 \cdot 9H_2O$, 9 g iron salt complexing agent triethanolamine, and 15 g amorphous iron hydroxyl oxide.

The waste agent is produced by a desulfurization process for removing $H_2S$ from an exhaust gas with the above desulfurizer. In detail, an exhaust gas having a $H_2S$ content of 5500 $mg/cm^3$ is introduced into a desulfurization section at a space velocity of 3000 $h^{-1}$ to carry out desulfurization reaction at a temperature of 30° C., and then a waste agent is collected in the desulfurization section when the content of $H_2S$ in an outlet gas of the desulfurization section is less than or equal to 0.01 ppm.

Adding sulfur: The waste agent is tested to determine a molar ratio of iron element to sulfur element comprised therein. If the molar ratio of iron element to sulfur element is less than 1:2, solid sulfur powder is added to the waste agent until the molar ratio of iron element to sulfur element reaches 1:2, thereby ensuring that the molar ratio of iron element to sulfur element in the reaction system is 1:2. However if the molar ratio of iron element to sulfur element is greater than 1:2, excess sulfur is removed by conventional methods such as solvent extraction or heating.

Preparation of Slurry:

Oil sand's oil and hogwash oil are mixed with the above catalyst to obtain a mixture, and then an appropriate amount of water is added to the mixture under stirring to form a first slurry. The catalyst has an average particle diameter of 5 μm.

Conversion Reaction:

A partial of a mixture of CO and $H_2$ (CO accounts for 60% and $H_2$ accounts for 40%) is pressurized to a pressure of 5.7 MPa and heated to a temperature, of 500° C., and then introduced to a pipeline which conveys the first slurry as described above. The remaining of the mixture of CO and $H_2$ is pressurized to a pressure of 5.2 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 5 MPa and a temperature of 470° C. The conversion reaction lasts for 90 min, during which a volume ratio of the mixture of CO and $H_2$ to the first slurry is controlled at 8000:1, producing a first oil product.

Embodiment 2

Provided is a co-conversion process for oil sand's oil and palm oil described as below.

Catalyst: A regeneration product of a waste agent resulting from use of a desulfurizer comprising $Fe_{21.333}O_{32}$ is used as a catalyst. The desulfurizer comprises 55 g $Fe_{21.333}O_{32}$, 12 g copper oxide, and 21 g $Fe_2O_3$ as carrier.

The desulfurizer is used in a desulfurization process for a coal pyrolysis gas comprising hydrogen sulfide, which is described as below.

(1) A compressed coal pyrolysis gas is cooled to a temperature of 30-35° C., and mixed with air from an air pump and introduced to a desulfurization tower filled with the above-mentioned desulfurizer which mainly comprises iron oxide as an active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfurizer, is produced and removed from the desulfurizer bed, i.e. obtaining a waste, agent resulting from use of a desulfurizer comprising $Fe_{21.333}O_{32}$.

The obtained waste agent was regenerated described as below:

1) The waste agent is dispersed in water to form, a slurry
2) The slurry is heated to a temperature of 60° C. under atmospheric pressure. Then hydrogen peroxide is added to the slurry by using a peristaltic pump at a flow rate of 500 mL/min to perform reactions for a period of 10 min under magnetic stirring.
3) After the reaction is completed, the resulted reaction solution is filtered, producing a precipitate which is then washed twice with water and then dried naturally to obtain a regeneration product of the above-mentioned waste agent.

Preparation of Slurry:

Oil sand's oil and palm oil are mixed with the above catalyst to obtain a mixture, and then an appropriate amount of water is added to the mixture under stirring to form a first slurry. The catalyst has an average particle diameter of 300 µm.

Conversion Reaction:

A partial of CO is pressurized to a pressure of 5.7 MPa and heated to a temperature of 500° C. and then introduced to a pipeline which conveys the first slurry. The remaining CO is pressurized to a pressure of 5.2 MPa and heated to a temperature of 500° C., and then injected to a slurry bed reactor through an inlet thereof to contact with the first slurry which has entered the slurry bed reactor, so that conversion reaction including cracking, carbonylation, shift and hydrogenation reactions takes place under a pressure of 5 MPa, a temperature of 470° C., and a controlled volume ratio of the mixture of CO and $H_2$ to the first slurry of 3000:1. The conversion reaction lasts for 90 min, during which hydrogen sulfide gas is introduced into the slurry bed reactor to ensure a molar ratio of iron element to sulfur element in the reaction system is 1:3, producing a first oil product.

Embodiment 3

Provided is a conversion process for palm oil, which is described as below.

Catalyst A waste agent resulting from use of a desulfurizer comprising iron oxide as an active component is used as a catalyst. The desulfurizer comprises 10 g calcium bicarbonate, 12 g basic cupric carbonate, 18 g $\gamma$-$Fe_2O_3$, 5 g $MnO_2$, and 5 g NiO.

The waste agent is produced by a desulfurization process with the above desulfurizer, which is described as follows.

1) Exhaust gas produced by fixed bed catalytic hydrogenation of medium-low temperature coal tar is collected.
2) The above mentioned desulfurizer is prepared into particles having a diameter of 1 mm and a length of 15 mm, and filled in a desulfurization tower to form a desulfurization layer.
3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

Preparation of Slurry:

Palm oil mixed with the above catalyst to obtain a mixture under stirring to form a first slurry. The catalyst has an average particle diameter of 10 µm.

Conversion Reaction:

A partial of a mixture of CO and $H_2$ (CO accounts for 60% and $H_2$ accounts for 40%) is pressurized to a pressure of 16 MPa and heated to a temperature of 400° C., and then introduced to a pipeline which conveys the first slurry. The remaining of the mixture of CO and $H_2$ is pressurized to a pressure of 16 MPa and heated to a temperature of 520° C., and then injected to a suspended bed reactor through an inlet thereof to contact with the first slurry which has entered the suspended bed reactor, so that conversion reaction including cracking, carbonylation, shift and hydrogenation reactions takes place, under a pressure of 15 MPa and a temperature of 420° C. The conversion reaction lasts for 30 min, during which a volume ratio of the mixture of CO and $H_2$ to the first slurry is controlled at 2000:1, producing a first oil product.

Embodiment 4

Provided is a conversion process for oil sand's oil, which is described as below.

Catalyst A regeneration product of a waste agent resulting from use of a desulfurizer comprising iron oxide as an active component is used as a catalyst. The desulfurizer comprises 50 g cubic $Fe_3O_4$, 12 g calcium sulphate dihydrate, 20 g basic zinc carbonate, and 6 g sodium carboxymethylcellulose.

The desulfurizer is used in a desulfurization process for petroleum comprising hydrogen sulfide, which is described as below.

(1) The above mentioned desulfurizer is prepared into particles having a diameter of 1.5 mm, and filled in a desulfurization tower to form a desulfurization layer.

(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.

The obtained waste agent is subjected to regeneration which is described as below:
1) The waste agent is mixed with water and stirred in a slurry tank to form a second slurry which has a solid content of 1.2% by weight.
2) Sodium hypochlorite is introduced into the second slurry to carry out a first oxidation reaction at 60° C. and 1 MPa, producing an oxidized slurry.
3) $Na_2S$ is added to the oxidized slurry to carry out a vulcanization reaction at 10° C. and 5 MPa, producing a vulcanized slurry.
4) Hydrogen peroxide is introduced into the vulcanized slurry to carry out a second oxidation reaction at 30° C. and 1.1 MPa to further oxidize and regenerate the slurry.
5) Steps 3) and 4) are repeated once to produce a final slurry wherein the molar ratio of iron to sulfur is 1:1.8.
6) The final slurry is subjected to solid-liquid separation to obtain the regeneration product of the above waste agent.

Adding, sulfur: Solid sulfur powder is added to the above regeneration product until the molar ratio of iron element to sulfur element comprised therein is 1:2, thereby ensuring that the molar ratio of iron element to sulfur element in the reaction system is 1:2.

Preparation of Slurry:

Oil sand's oil is mixed with the above catalyst to obtain a mixture under stirring to form a first slurry. The catalyst has an average particle diameter of 400 μm.

Conversion Reaction:

Synthesis gas (CO accounts for 20%) is pressurized to a pressure of 18.2 MPa and heated to a temperature of 450° C., and then introduced into a bubbling bed reactor through four injection ports on the side and bottom of the bubbling bed reactor to contact with the first slurry which has entered the bubbling bed reactor to carry out conversion reaction including cracking, carbonylation, shift and hydrogenation reactions under a pressure of 18 MPa and a temperature of 380° C. The conversion reaction lasts for 100 min, during which the volume ratio of the synthesis gas to the first slurry, is 950:1, producing a first oil product.

Embodiment 5

Provided is a conversion process for oil sand's oil, which is the same as that of embodiment 4 except for the regeneration method. The waste agent is regenerated as described below.
1) Water vapor with a pressure of 1.5 MPa is introduced into a heating furnace to heat to 450° C.
2) The heated water vapor is introduced into a desulfurization tank at a speed of 15 m/s to heat the waste agent contained therein.
3) The waste agent is kept at 400° C. for 2 h under heating by the water vapor which is consumed at a speed of 6 t/h.
4) The pH of the outlet of the desulfurization tank is analyzed, and when the pH is greater than or equal to 7.5 for three times, a small amount of coke oven gas is introduced into the desulfurization tank for carrying out reduction.
5) Coke oven gas coming from a first hydrogenation in a refined desulfurization process is introduced to the desulfurization tank at 800 m³/h for reducing the waste agent.

6) $H_2$ concentration at the inlet and outlet is tested every 30 minutes after the coke oven gas is introduced. A regeneration product is obtained when the $H_2$ concentration at the outlet is stably greater than or equal to the $H_2$ concentration at the inlet (3 times of, analysis).

Embodiment 6

Provided is a conversion process for oil sand's oil and colza oil, which is described as below.

Catalyst: A regeneration product of a waste agent resulting from use of a desulfurizer comprising FeOOH is used as a catalyst. The desulfurizer comprises 45% by weight of γ-FeOOH, 35% by weight of α-FeOOH, 15% by weight of molecular sieve as carriers, and 5% by weight of sesbania powder as binder.

The desulfurizer is used in a desulfurization process for removing $H_2S$ from exhaust gas, which is described as below. An exhaust gas having a $H_2S$ content of 5500 mg/cm³ is introduced to a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent in the desulfurization section is collected.

The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, the iron sulphides in the waste agent have been completely converted into FeOOH and elemental sulfur, producing a slurry comprising FeOOH and elemental sulfur. Filtering the slurry to obtain a solid material, and extracting the solid material with $CCl_4$ for three times, then combining the extracted liquids, and recovering the solvents by distillation to obtain crystalline elemental sulfurs. Mixing the remaining solids separated from the extraction liquids with sesbania powders to obtain a regeneration product of the above-mentioned waste agent, wherein the amount of the binder sesbania powders is 5% by mass of the solids.

Adding carbon disulfides: Adding carbon disulfides into the above catalyst until the molar ratio of iron element to sulfur element is 1:2, thereby ensuring that the molar ratio of iron element to sulfur element in the reaction system is 1:2.

Preparation of Slurry:

Mixing oil sand's oil, colza oil and the above catalyst, to obtain a mixture, and stirring to form a first slurry. The catalyst has an average particle diameter of 5 mm.

Conversion Reaction:

A partial of a mixture of CO and $H_2$ (CO accounts for 60% and $H_2$ accounts for 40%) is pressurized to a pressure of 16.8 MPa and heated to a temperature of 250° C., and then introduced to a pipeline which conveys the first slurry. Then the remaining of the mixture of CO and $H_2$ is pressurized to a pressure of 16.2 MPa and heated to a temperature of 550° C., and injected into a fluidized bed reactor through an inlet thereof to contact with the first slurry which has entered fluidized bed reactor to carry out conversion reaction including cracking, carbonylation, shift and hydrogenation reactions under a reaction pressure of 16 MP and a reaction temperature of 420° C. The conversion reaction lasts for 60 min, during which the volume ratio of the mixture of CO and $H_2$ to the first slurry is 5000:1, producing a first oil product.

Test Example 1

The oil products prepared in the Embodiments 1-6 are tested and analyzed according to the following methods.

The conversion rate of liquid mineral oils %=(the mass of materials with boiling point greater than 360° C. in the combined liquid mineral oils−the total mass of oils with boiling point greater than 360° C. in the products) the mass of materials with boiling point greater than 360° C. in the combined liquid mineral oils.

The yield of conversion oils in the liquid mineral oils %=the mass of liquid phase oils at normal temperature and pressure in the conversion products/the mass of the total change raw liquid mineral oils.

The rate of water produced in the reaction %=(the water mass of the reaction products−total mass of water added initially in the reaction or carried by the raw materials)/the mass of the total charge raw materials. When this value is <0, it is marked as "none".

The corresponding test results are shown in Table 1. Table 1 shows that the yield of conversion oils in the liquid mineral oils using the method of the present invention is greater than 90%; the calorific value of conversion oils of liquid mineral oils is 0.92 times greater than that of equal amount of standard fuel oil, and the oxygen content of oil phase in the conversion oils of liquid mineral oils is less than 3%. There is no water in the raw materials after the reaction, the rate of water produced in the reaction in the conventional hydrogenation process under pure hydrogen in the prior art is 25 wt % or more.

of iron element to sulfur element is less than 1:2, solid sulfur powder is added into the waste agent until the molar ratio of iron element to sulfur element is 1:2, thereby ensuring that the molar ratio of iron element to sulfur element in the reaction system is 1:2. However if the molar ratio of iron element to sulfur element is greater than 1:2, excess sulfur is removed by conventional methods such as solvent extraction or heating.

Preparation of Slurry:

Mixing hogwash oil with the above catalyst to obtain a mixture, and adding 5% by mass of water to the mixture under stirring to form a first slurry The catalyst has an average particle diameter of 5 μm. The provided conversion process comprises multiple stages, and the catalysts accounts for 3% by weight of the first slurry.

First Conversion Reaction:

A mixture of CO and $H_2$ (CO accounts for 60% and $H_2$ accounts for 40%) is pressurized to a pressure of 17 MPa and heated to a temperature of 400° C., and then injected together with the first, slurry that has been pressurized to 17 MPa and heated to 320° C., into a suspended bed reactor from the bottom thereof to carry out first conversion reaction including cracking, carbonylation, shift and hydrogenation reactions under a pressure of 16.5 MPa and a temperature of 350° C. The first conversion reaction lasts for 60 min, during which the volume ratio of the mixture of CO and $H_2$ to the first slurry is 2000:1, producing a first conversion product, i.e. a first oil product.

Second Conversion Reaction:

The first conversion product is mixed with pure hydrogen, then pressurized to a pressure of 16 MPa and heated to a temperature of 300° C., and then introduced into a fixed bed reactor which contains a nickel-molybdenum hydrogenation catalyst to carry out second conversion reaction including cracking and hydrogenation reactions under a pressure of 15.5 MPa and a temperature of 350° C. The hydrogenation catalyst consists of molecular sieves loading 2% MoO and 6% NiO based on the total weight of the hydrogenation catalyst, and is present in an amount of 3% by mass of the first conversion product. The second conversion reaction lasts for 45 min, during which the volume ratio of $H_2$ to the first conversion product is 2000:1, producing a clean oil product.

TABLE 1

Product distributions after conversion of liquid mineral oil raw materials

| Conversion results | Conversion rate of liquid mineral oils % | Yield of oils converted from liquid mineral oils % | Carbon content of oil phase in the oils converted from liquid mineral oils wt % | Hydrogen content of oil phase in the oils converted from liquid mineral oils wt % | Oxygen content of oil phase in the oils converted from liquid mineral oils wt % | Calorific value of oils converted from liquid mineral oils (times of the calorific value of standard fuel oil) | Rate of water produced in the reaction wt % |
|---|---|---|---|---|---|---|---|
| Embodiment 1 | 94.8 | 93.6 | 84.0 | 11.5 | 0.9 | 0.940 | none |
| Embodiment 2 | 96.7 | 90.8 | 85.1 | 10.0 | 1.6 | 0.931 | none |
| Embodiment 3 | 97 | 92 | 85.2 | 11.2 | 1.1 | 0.932 | none |
| Embodiment 4 | 96.2 | 92.8 | 84 | 11.4 | 2 | 0.941 | none |
| Embodiment 5 | 95.1 | 90.5 | 82 | 10.1 | 2.4 | 0.925 | none |
| Embodiment 6 | 95.4 | 92 | 84.1 | 11.5 | 1.7 | 0.942 | none |

Embodiment 7

Provided is a conversion process for hogwash oil, comprising the following steps:

Catalyst: A waste agent resulting from use of a desulfurizer comprising FeOOH as an active component is used as a catalyst. The desulfurizer comprises 6 g soluble iron salt $Fe(NO_3)_3 \cdot 9H_2O$, 9 g iron salt complexing agent triethanolamine, and 15 g amorphous iron hydroxyl oxide.

The waste agent is produced by a desulfurization process for removing $H_2S$ from an exhaust gas described as below. An exhaust gas having a $H_2S$ content of 5500 mg/cm³ is introduced into a desulfurization section at a space velocity of 3000 h⁻¹ to carry out desulfurization reaction at 30° C. When the content of $H_2S$ in the outlet gas of the desulfurization section is less than or equal to 0.01 ppm, a waste agent is produced and collected in the desulfurization section, i.e. obtaining the waste agent mentioned above.

Adding, sulfur: The molar ratio of iron element to sulfur element in the waste agent is determined. If the molar ratio Embodiment 8

Provided is a con-conversion process for wood tar and rancid oil described as below.

Catalyst: A regeneration product of a waste agent resulting from use of a desulfurizer comprising $Fe_{21.333}O_{32}$ is used as a catalyst. The desulfurizer comprises 55 g magnetic iron oxide red $Fe_{21.333}O_{32}$, 12 g copper oxide, and 21 g carrier $Fe_2O_3$.

The desulfurizer is used in a desulfurization process for a coal pyrolysis gas containing hydrogen sulfide described as below.

(1) A compressed coal pyrolysis gas is cooled to 30-35° C., and mixed with air from an air pump and introduced into a desulfurization tower filled with the above-mentioned desulfurizer which mainly comprises iron oxide as an, active component. The compressed coal pyrolysis gas enters at the bottom and exits at the top, thereby preventing liquid water from entering the desulfurizer bed.

(2) After many times use of the above-mentioned desulfurizer, a waste agent, i.e. spent desulfurizer, is produced and removed from the desulfurizer bed, i.e. obtaining a waste, agent resulting from use of a desulfurizer comprising $Fe_{21.333}O_{32}$.

The obtained waste agent was regenerated described as below;

1) The waste agent is dispersed in water to form a slurry.

2) The slurry is heated to 60° C. under atmospheric pressure. Then hydrogen peroxide is added to the slurry by using a peristaltic pump at a flow rate of 500 mL/min to perform reactions for a period of 10 min under magnetic stirring.

3) After the reaction is completed, the resulted reaction solution is filtered, producing a precipitate which is then washed twice with water and then dried naturally to obtain a regeneration product of the above-mentioned waste agent.

Preparation of Slurry:

Mixing wood tar, rancid oil and the above catalyst to obtain a mixture, and adding water to the mixture, wherein, the water accounts for 5% by mass of the mixture, followed by stirring to, faun a first slurry. The catalyst has an average particle diameter of 300 μm, and a concentration of 5 wt %.

First Conversion Reaction:

A mixture of CO and $H_2$ (CO accounts for 40% and $H_2$ accounts for 60%) is pressurized to a pressure of 12 MPa and heated to a temperature of 370° C., and then injected together with the first slurry that has been pressurized to 12 MPa and heated to 300° C. into a bubbling bed reactor from the bottom thereof to carry out first conversion reaction including cracking, carbonylation, shift and hydrogenation reactions under a pressure of 11.5 MPa and a temperature of 340° C. The first conversion reaction lasts for 90 min, during which the volume ratio of the mixture of CO and $H_2$ to the first shiny is 1000:1, producing a first conversion product, i.e. a first oil product.

Second Conversion Reaction:

Firstly, an iron-based catalyst is added to the first conversion product. The iron-based catalyst is amorphous hydroxyl oxidize iron and has an amount of 0.5 wt % by mass of the first conversion product.

The first conversion product is then mixed with a hydrogen-rich gas (the volume of $H_2$ is 90%), and pressurized to a pressure of 8.8 MPa and heated to a temperature of 320° C., then injected into a slurry bed reactor from an inlet thereof to carry out second conversion reaction including cracking and hydrogenation reactions under a pressure of 8 MPa and a temperature of 380° C. The second conversion reaction lasts for 60 min, during which the volume ratio of the hydrogen-rich gas to the first conversion product is 1500:1, producing a clean oil product.

Embodiment 9

Provided is a conversion process for oil sand's oil, comprising the following steps:

Catalyst: A waste agent resulting from use of a desulfurizer comprising iron oxide as an active component is used as a catalyst. The desulfurizer comprises 10 g calcium bicarbonate, 12 g basic cupric carbonate, 18 g γ-$Fe_2O_3$ is, and 5 g $MnO_2$.

The waste agent is produced by a desulfurization process with the above desulfurizer, which is summarized as follows:

1) Exhaust gas produced by fixed bed catalytic hydrogenation of medium-low temperature coal tar is collected.

2) The above mentioned desulfurizer is prepared into particles having a diameter of 1 mm and a length of 15 mm and filled in a desulfurization tower to form a desulfurization layer, 3) The collected exhaust gas passes through the desulfurization layer at a space velocity of 2000 $h^{-1}$, so that desulfurization reaction takes place when the exhaust gas contact with the desulfurizer in the desulfurization layer at 50° C. to remove hydrogen sulfide in the exhaust gas. After the reaction is completed, a waste agent, i.e. a spent desulfurizer, is collected and cooled to room temperature, i.e. obtaining a waste agent resulting from use of a desulfurizer comprising iron oxide as an active component.

Adding sulfur: The waste agent is tested to determine a molar ratio of iron element to sulfur element comprised therein. If the molar ratio of iron element to sulfur element is less than 1:1, solid sulfur powder is added to the waste agent until the molar ratio of iron element to sulfur element reaches 1:1, thereby ensuring that the molar ratio of iron element to sulfur element in the reaction system is 1:1. However if the molar ratio of iron element to sulfur element is greater than 1:1, excess sulfur is removed by conventional methods such as solvent extraction or heating.

Preparation of Slurry:

Oil sand's oil is mixed with the above catalyst, to obtain a mixture, and water is added to the mixture at an amount of 5% by mass of the mixture under stirring to form a first slurry. The catalyst has an average particle diameter of 10 μm, and a concentration of 2 wt %.

First Conversion Reaction:

A mixture of CO and $H_2$ (CO accounts for 30% and $H_2$ accounts for 70%) is injected into a slurry bed reactor from three injection ports on the bottom and side walls thereof to contact with the first slurry which has already entered the slurry bed reactor to carry out first conversion reaction including cracking, carbonylation, shift and hydrogenation reactions under a pressure of 19 MPa and a temperature of 460° C. The first conversion reaction lasts for 90 min, during which the volume ratio of the mixture of CO and $H_2$ to the first slurry is 800:1, producing a first conversion product, i.e. a first oil product.

Second Conversion Reaction:

The first conversion product is mixed with a hydrogen-rich gas (wherein $H_2$ accounts for 92% by volume), and pressurized to a pressure of 18 MPa and heated to a temperature of 330° C., then injected to a fixed bed reactor which contains a hydrogenation catalyst therein to carry out second conversion reaction including cracking and hydrogenation reactions under a pressure of 18 MPa and a temperature of 390° C. The hydrogenation catalyst consists of zeolite loading 2% MoO, 6% NiO and 3% CoO based on the total weight of the hydrogenation catalyst, and is present in an amount of 2 wt % by mass of the first conversion product. The second conversion reaction lasts for 40 min, during which the volume ratio of $H_2$ to the first conversion product is 1000:1, producing a clean oil product.

Embodiment 10

Provided is a conversion process for coal tar and palm oil, comprising the following steps:
Catalyst: A regeneration product of a waste agent resulting from use of a desulfurizer comprising iron oxide as an active component is used as a catalyst. The desulfurizer comprises 50 g $Fe_3O_4$ of cubic crystal, 12 g calcium sulphate dihydrate, 20 g basic zinc carbonate, and 6 g sodium carbomethylcellulose.
The desulfurizer is used in a desulfurization process for petroleum containing hydrogen sulfide described as below.
(1) The above mentioned desulfurizer is prepared into particles having a diameter of 1.5 mm, and filled in a desulfurization tower to form a desulfurization layer.
(2) Petroleum comprising hydrogen sulfide is sprayed by a nozzle into the desulfurization layer from the top of the desulfurization tower to carry out desulfurization under spraying. After desulfurization is completed, a spent desulfurizer is produced, which is the waste agent resulting from use of a desulfurizer comprising iron oxide.
The obtained waste agent is subjected to regeneration comprising the following steps:
1) The waste agent is mixed with water and stirred in a slurry tank to form a second slurry which has a solid content of 12% by weight.
2) Sodium hypochlorite is introduced into the second slurry to carry out a first oxidation reaction at 60° C. and 1 MPa, producing an oxidized slurry;
3) $Na_2S$ is added to the oxidized slurry to carry out a vulcanization reaction at 10° C. and 5 MPa, producing a vulcanized slurry.
4) Hydrogen peroxide is introduced into the vulcanized slurry to carry out a second oxidation reaction at 30° C. and 1.1 MPa to further oxidize and regenerate the slurry.
5) Steps 3) and 4) are repeated once to produce a final slurry wherein the molar ratio of iron to sulfur 1:1.8.
6) The final slurry is subjected to solid-liquid separation to obtain the regeneration product of the above waste agent.
Adding sulfur: Solid sulfur powder is added to the above regeneration product until the molar ratio of iron element to sulfur element comprised therein is 1:2, thereby ensuring that the molar ratio of iron element to sulfur element in the reaction system is 1:2.
Preparation of Slurry:
Coal tar and palm oil are mixed with the above catalyst to obtain a mixture, and water is added to the mixture at an amount of 2% by mass of the mixture under stirring to form a first slurry. The catalyst has an average particle diameter of 400 μm, and a concentration of 4 wt %.
First Conversion Reaction:
A mixture of CO and $H_2$ (CO accounts for 50% and $H_2$ accounts for 50%) is injected together with the first slurry into a slurry bed reactor from three injection ports on side walls thereof to carry out first conversion reaction including cracking, carbonylation, shift and hydrogenation reactions under a pressure of 20 MPa and a temperature of 430° C. The reaction lasts for 30 min, during which the volume ratio of the mixture of CO and $H_2$ to the first slurry is 650:1, producing a first conversion product, i.e. a first oil product.

Second Conversion Reaction:
An iron-based catalyst is added to the first conversion product at a dosage of 1.9 wt % of the conversion product.
Pure hydrogen is pressurized to a pressure of 15.6 MPa and heated to a temperature of 320° C., and injected into a fixed bed reactor to contact with the slurry that has already entered therein to carry out second conversion reaction including cracking and hydrogenation reactions under a pressure of 15 MPa and a temperature of 350° C. The second conversion reaction lasts for 90 min, during which the volume ratio of pure $H_2$ to the first conversion product is 800:1, producing a clean oil product.

Embodiment 11

Provided is a conversion process for thickened oil and waste engine oil, comprising the following steps:
Catalyst: A regeneration product resulting from use of a waste agent of a desulfurizer comprising FeOOH is used as a catalyst. The desulfurizer comprises 45% γ-FeOOH, 35% α-FeOOH, 15% carrier molecular sieve, and 5% binder sesbania powder based on the total mass of the desulfurizer.
The waste agent is produced by a desulfurization process for removing $H_2S$ from an exhaust gas described as below. An exhaust gas having a content of 5500 mg/cm³ is introduced into a desulfurization section at a space velocity of 3000 $h^{-1}$ to carry out desulfurization reaction at 30° C. When the content of $H_2S$ in the outlet gas of the desulfurization section is less than or equal to 0.01 ppm, a waste agent is produced and collected the desulfurization section, i.e. obtaining the waste agent mentioned above.
The obtained waste agent was regenerated described as below: The waste agent is washed with water, and then ground with water in a wet ball mill to obtain a waste powder of 80 mesh. The waste powder is prepared into an aqueous suspension with a solid mass percentage of 8%, into which compressed air is introduced. Sample is taken for testing after reacting for a period of time. When there is no $H_2S$ produced from the reaction between the sample and hydrochloric acid, it indicates that the iron sulphide in the waste agent have been completely converted into hydroxyl oxidize iron and elemental sulfur, producing, a slurry comprising the iron hydroxyl oxidize iron and elemental sulfur. Filtering the slurry to obtain a solid material, and extracting the solid materials with $CCl_4$ for three times, then combining the extracted liquids, and recovering the solvents by distillation to obtain crystalline elemental sulfurs. Mixing the remaining solids separated from the extraction liquids with the binder sesbania powders to obtain a regeneration product of the above-mentioned waste agent, wherein the amount of the binder sesbania powders is 5% by mass of the solids.
Adding carbon disulfides: Adding carbon disulfides into the above catalyst until the molar ratio of iron element to sulfur element is 1:2, thereby ensuring that the molar ratio of iron element to sulfur element in the reaction system is 1:2.
Preparation of Slurry:
Mixing thickened oil, waste engine oil and the above catalyst to obtain a mixture, and adding water to the mixture at an amount of 5% by mass of the mixture under stirring to form a first slurry. The catalyst has an average particle, diameter of 5 μm, and a concentration of 2 wt %.
First Conversion Reaction:
A mixture of CO and $H_2$ (CO accounts for 20% and $H_2$ accounts for 80%) is pressurized to a pressure of 18.4 MPa and heated to a temperature of 400° C., and then injected into a slurry bed reactor from three injection ports on side walls thereof to contact with the first slurry which has entered therein to carry out first conversion reaction including cracking, carbonylation, shift and hydrogenation reactions under a pressure of 18 MPa and a temperature of 440° C. The reaction lasts for 30 min, during, which the volume ratio of the mixture of CO and $H_2$ to the first slurry is 800:1, producing a first conversion product, i.e. a first oil product.

Second Conversion Reaction:

Iron-based catalyst is added to the first conversion product at a dosage of 1.9 wt % of the first conversion product.

A hydrogen-rich gas ($H_2$ accounts for 92% by volume) is pressurized to a pressure of 17 MPa and heated to a temperature of 390° C., and introduced into a fixed bed reactor to contact with the first conversion product which has entered therein to carry out second conversion reaction including cracking and hydrogenation reactions under a pressure of 16 MPa and a temperature of 400° C. The second conversion reaction lasts for 120 min, during which the volume ratio of the hydrogen-rich gas to the first conversion product is 600:1, producing a clean oil product.

Test Example 2

The products prepared in the Embodiments 6-11 are tested and analyzed according to the following methods.

The conversion rate of inferior oils %=(the mass of materials with boiling point greater than 360° C. in the combined inferior oils–the total mass of oils with boiling point greater than 360° C. in the products) the mass of materials with boiling point greater than 360° C. in the combined inferior oils.

The yield of conversion oils in the inferior oils %=the mass of liquid phase oils at normal temperature and pressure in the conversion products/the mass of the total charge inferior oils.

The rate of water produced in the reaction %=(the water mass of the reaction products–total mass of water added initially in the reaction or carried by the raw materials)/the mass of the total charge raw materials. When this value is <0, it is marked as "none".

The corresponding test results are shown in Table 2:

TABLE 2

Product distributions after conversion of liquid mineral oil raw materials

| Conversion results | Conversion rate of inferior oils wt % | Yield of oils converted from inferior oil wt % | Carbon content of oil phase in the obtained conversion oils wt % | Hydrogen content of oil phase in the obtained conversion oils wt % | Oxygen content of oil phase in the obtained conversion oils wt % | Rate of water produced in the reaction wt % |
| --- | --- | --- | --- | --- | --- | --- |
| Embodiment 7 | 98 | 81.3 | 85.1 | 14.3 | 0.05 | none |
| Embodiment 8 | 97.7 | 80.8 | 86.1 | 12.4 | 1.1 | none |
| Embodiment 9 | 96.9 | 91 | 87.2 | 12.5 | none | none |
| Embodiment 10 | 97.2 | 90.1 | 85 | 13.4 | 0.5 | none |
| Embodiment 11 | 96.1 | 92.5 | 86.1 | 13.1 | none | none |

Apparently, the aforementioned embodiments are merely examples illustrated for clearly describing the present invention, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to, be embraced within the protection scope of the present invention.

We claim:

1. A conversion process for an inferior oil, characterized by comprising the following steps:
   preparing a first slurry that comprises a catalyst and an inferior oil, wherein the catalyst is at least one selected from the group consisting of an iron oxide compound, a desulfurization waste agent resulting from use of an iron oxide compound as desulfurizer, and a regeneration product of a desulfurization waste agent resulting from use of an iron oxide compound as desulfurizer;
   carrying out a first conversion reaction by mixing the first slurry with a pure CO gas or a CO containing gas and keeping a molar ratio of iron element to sulfur element of 1:1 in a reaction system, thereby obtaining a first conversion oil product.

2. The conversion process according to claim 1, characterized in that a sulfur-containing substance is added to the catalyst to control the reaction system to have a molar ratio of iron element to sulfur element of 1:1.

3. The conversion process according to claim 2, characterized in that the sulfur-containing substance is at least one selected from the group consisting of sulfur, hydrogen sulfide, and carbon disulfide.

4. The conversion process according to claim 1, characterized in that the CO containing gas has a CO volume content of no less than 15%.

5. The conversion process according to claim 4, characterized in that the CO containing gas is a gas mixture of CO and $H_2$ or a synthesis gas.

6. The conversion process according to claim 1, characterized in that the desulfurization waste agent is at least one selected from the group consisting of a waste agent of a desulfurizer comprising iron oxide as an active component, a waste agent of a desulfurizer comprising $Fe_{21.333}O_{32}$ as an active component and a waste agent of a desulfurizer comprising FeOOH as an active component; or
   the regeneration product is at least one selected from the group consisting of a regeneration product of a desulfurization waste agent of a desulfurizer comprising iron oxide as an active component, a regeneration product of a desulfurization waste agent of a desulfurizer comprising $Fe_{21.333}O_{32}$ as an active component, and a regeneration product of a desulfurization waste agent of a desulfurizer comprising FeOOH as an active component.

7. The conversion process according to claim 6, characterized in that the iron oxide is $Fe_2O_3$ and/or $Fe_3O_4$.

8. The conversion process according to claim 7, characterized in that the $Fe_2O_3$ is at least one selected from the group consisting of $\alpha$-$Fe_2O_3$, $\alpha$-$Fe_2O_3 \cdot H_2O$, $\gamma$-$Fe_2O_3$, $\gamma$-$Fe_2O_3 \cdot H_2O$, amorphous $Fe_2O_3$, and amorphous $Fe_2O_3 \cdot H_2O$;

the $Fe_3O_4$ is of cubic crystal system; and the FeOOH is at least one selected from the group consisting of $\alpha$-FeOOH, $\beta$-FeOOH, $\gamma$-FeOOH, $\delta$-FeOOH, $\theta$-FeOOH, and amorphous FeOOH.

9. The conversion process according to claim 1, characterized in that the regeneration product is selected as the catalyst for the first conversion reaction, and the regeneration product is obtained with a slurry method by subjecting the desulfurization waste agent resulting from use of iron oxide compound as desulfurizer to oxidation, vulcanization and oxidation.

10. The conversion process according to claim 9, characterized in that the slurry method comprises the following steps:

preparing a second slurry by mixing the desulfurization waste agent resulting from use of iron oxide compound as desulfurizer with water or an alkali solution;

carrying out a first oxidation reaction by adding an oxidizing agent to the second slurry to obtain an oxidized slurry;

carrying out a vulcanization reaction by adding a vulcanizing agent to the oxidized slurry to obtain a vulcanized slurry;

carrying out a second oxidation reaction by adding an oxidizing agent to the vulcanized slurry;

repeating the vulcanization reaction and the second oxidation reaction to obtain a final slurry; and subjecting the final slurry to solid-liquid separation to obtain the regeneration product.

11. The conversion process according to claim 1, characterized in that the first conversion reaction is carried out at a reaction pressure of 5-22 MPa and a reaction temperature of 200-480° C.

12. The conversion process according to claim 11, characterized in that the first conversion reaction has a reaction time of no less than 15 min.

13. The conversion process according to claim 1, characterized in that the catalyst is present in an amount of 0.1 to 10% by weight in the first slurry; and the catalyst has an average particle diameter of from 0.1 µm to 5 mm.

14. The conversion process according to claim 1, characterized in that said carrying out a first conversion reaction by mixing the first slurry with a pure CO gas or a CO containing gas comprises the following steps:

pressurizing and heating a pure CO gas or CO containing gas to a pressure of 5-22 MPa and a temperature of 150-600° C., then mixing with the first slurry in a reaction system to carry out a first conversion reaction.

15. The conversion process according to claim 1, characterized in that said carrying out a first conversion reaction by mixing the first slurry with a pure CO gas or a CO containing gas comprises the following steps:

the pure CO gas or CO containing gas consisting of a first flow and a second flow, pressurizing and heating the first flow to a pressure of 5-22 MPa and a temperature of 150-600° C., then introducing the first flow though a first inlet into the first slurry in a reaction system to carry out a first conversion reaction, and pressurizing and heating the second flow to a pressure of 5-22 MPa and a temperature of 300-600° C., then introducing the second flow though a second inlet into the first slurry in a reaction system to carry out a first conversion reaction.

16. The conversion process according to claim 1, characterized in that a volume ratio of the pure CO gas or CO containing gas to the first slurry is (50-10000):1.

17. The conversion process according to claim 1, characterized in that the conversion process further comprises carrying out a second conversion reaction at a reaction pressure of 5-22 MPa and a reaction temperature of 250-450° C. with the first conversion oil product and a hydrogen-rich gas to obtain a final oil product.

18. The conversion process according to claim 17, characterized in that the hydrogen-rich gas has a hydrogen content by volume of no less than 80%.

19. The conversion process according to claim 17, characterized in that the first conversion reaction is carried out in a slurry bed reactor, a bubbling column reactor or a suspended bed reactor;

the second conversion reaction is carried out in a slurry bed reactor, a bubbling column reactor, a suspended bed reactor or a fixed bed reactor, and hydrocracking and refining reactions occurs in the second conversion reaction under a hydrogen-rich atmosphere.

20. The conversion process according to claim 17, characterized in that the second conversion reaction has a reaction time of no less than 15 min.

21. The conversion process according to claim 17, characterized in that a volume ratio of the hydrogen-rich gas to the first conversion product is (200 to 5000):1.

22. The conversion process according to claim 17, characterized in that the conversion process comprises a step of adding a hydrogenation catalyst and/or a further amount of the catalyst to the first conversion oil product before carrying out the second conversion reaction.

23. The conversion process according to claim 17, characterized in that when the inferior oil is a mineral oil, the first slurry is a non-aqueous slurry, and the mineral oil is only subjected to the first conversion reaction; and when the inferior oil is an oil other than a mineral oil, the first slurry is an aqueous slurry.

* * * * *